United States Patent [19]

Vogl et al.

[11] Patent Number: 5,133,528
[45] Date of Patent: Jul. 28, 1992

[54] COINLESS TELEPHONE REINFORCING PLATE

[75] Inventors: Allen W. Vogl, Melbourne; Douglas J. Buron, Micco, both of Fla.

[73] Assignee: International Teleservice Corporation, Melbourne, Fla.

[21] Appl. No.: 687,952

[22] Filed: Apr. 19, 1991

[51] Int. Cl.⁵ ............................................. F16M 13/00
[52] U.S. Cl. .................................... 248/551; 248/300; 379/437
[58] Field of Search ............... 248/551, 553, 300, 305, 248/220.2; 379/437, 440, 451, 435

[56] References Cited

U.S. PATENT DOCUMENTS

| 1,634,884 | 7/1927 | Peer | 248/551 X |
| 4,246,451 | 1/1981 | Nix | 248/553 |
| 4,396,176 | 8/1983 | Hannula | 248/551 |
| 5,014,959 | 5/1991 | Soubliere | 248/551 |

Primary Examiner—Ramon O. Ramirez
Attorney, Agent, or Firm—Evenson, Wands, Edwards, Lenahan & McKeown

[57] ABSTRACT

An internal support plate is inserted on the backing plate of a coinless telephone station to reinforce a projection on the backing plate without any field modification of the station. The internal support plate has a projection which is sized and configured to mate with and thereby reinforce the projection on the backing plate.

4 Claims, 2 Drawing Sheets

COINLESS TELEPHONE REINFORCING PLATE

BACKGROUND AND SUMMARY OF THE INVENTION

The present invention relates to a reinforcement device and method for a telephone station, such as a coinless or credit card station (i.e. charge-a-call stations), and, more particularly, to an internal support plate which prevents the front cover from being lifted off the backing plate of the station by the application of force strong enough to band the backing plate retaining tab.

Coinless or charge-a-call stations have recently become more popular. Security has been of some concern with regard to these stations in, for example, penal institutions where the front cover can be removed from the backing plate mounted on wall by pushing the front cover upwardly with sufficiently great force and thereby bending a tongue protruding from the backing plate which normally retains the front cover securely on the backing plate with a security bolt or screw.

An object of the present invention is to provide a simple and effective way of reinforcing the tongue on existing stations without the need for any field modifications of the station. This object has been achieved with the provision of an internal plate with a tongue which mate with the tongue or tab protruding from the backing plate and which can be easily mounted at the backing plate with screws the standard mounting or the like.

BRIEF DESCRIPTION OF THE DRAWINGS

These and other objects, features and advantages of the present invention will become more apparent from the following detailed description of a presently preferred embodiment when taken in conjunction with the accompanying drawings, wherein.

DETAILED DESCRIPTION OF THE DRAWINGS

Figure 1:
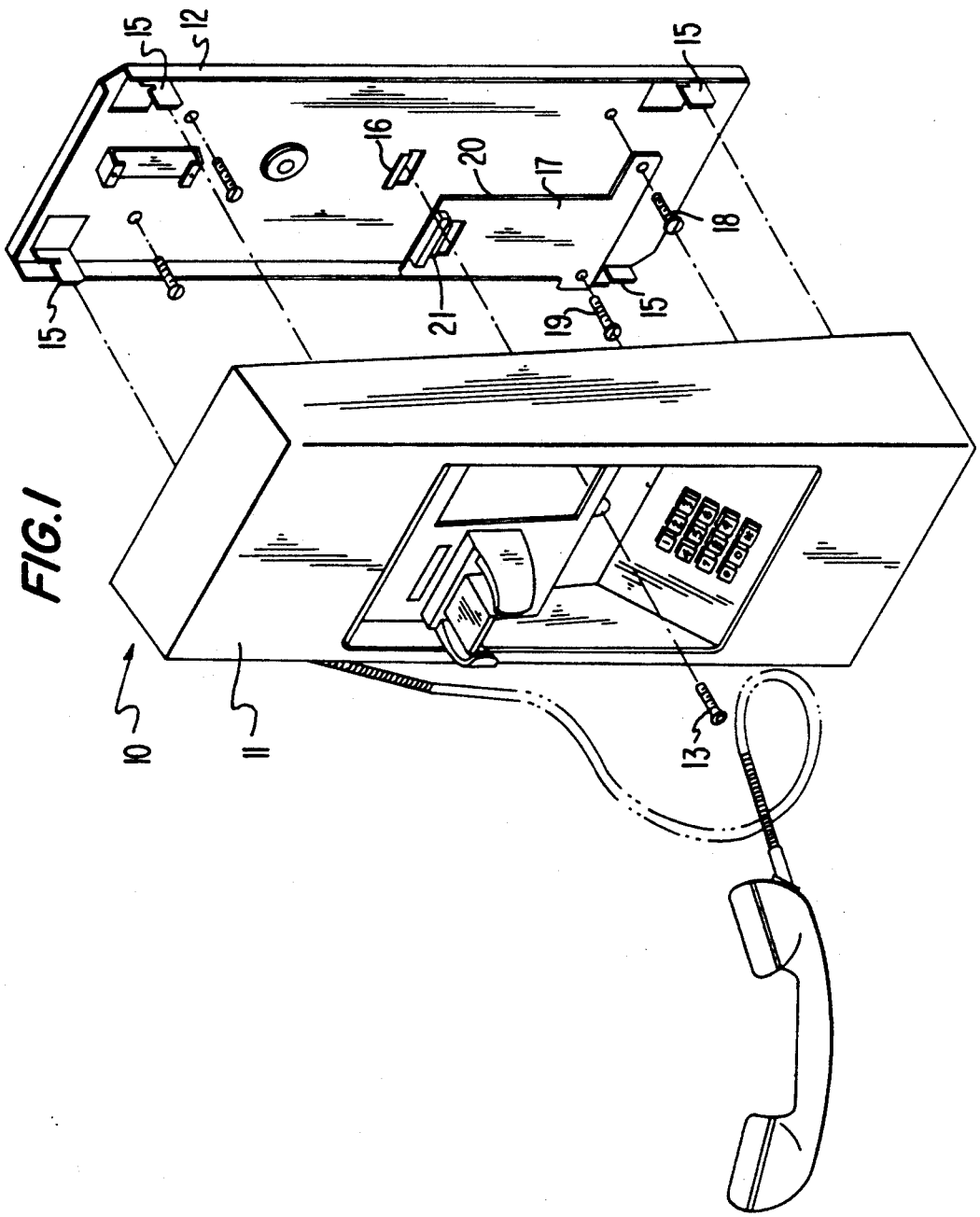
FIG. 1 is a perspective, exploded view of a conventional coinless telephone station with the intermediate, internal support plate of the present invention.
Figure 2:
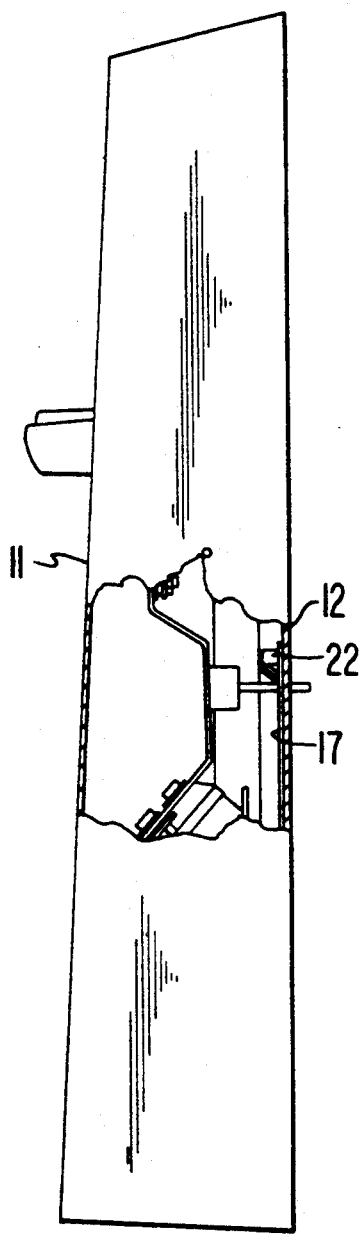
FIG. 2 is a partially sectioned or cutaway side view of the station in FIG. 1 in the fully assembled condition.
Figure 3:
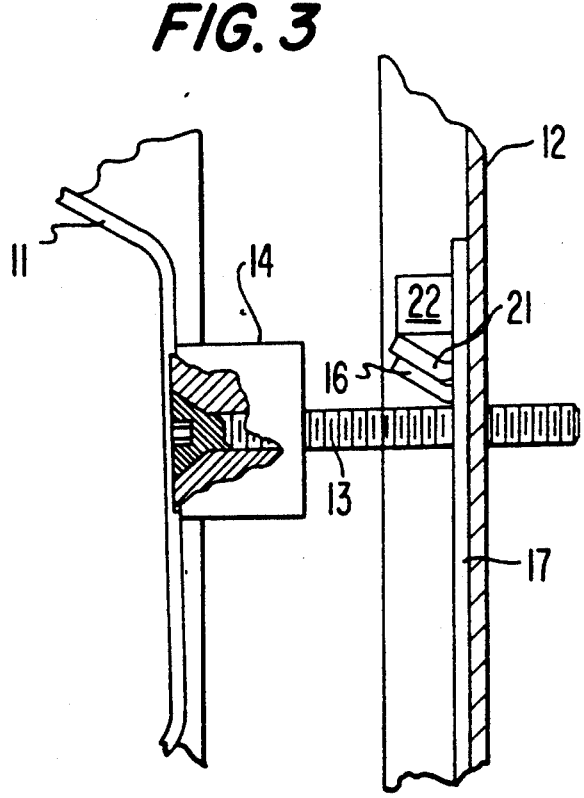
FIG. 3 is an enlarged sectional view of the cutaway portion in FIG. 2.

A conventional coinless telephone station is designated generally by the numeral 10. The station 10 will not be described in detail inasmuch as its structure and operation are well known to those skilled in the art. Essentially, the station 10 comprises a front cover 11 which contains the conventional dial pad, switch hook and the electronic circuitry, and a backing plate 12 which is mounted against a wall (not shown) usually at the four locations by bolts, screws or the like. A security bolt or screw 13 of generally known construction is threaded through a threaded collar 14 (FIGS. 2 and 3) in the front cover 11 in a known manner, which cover 11 has been put on the backing plate 12 and held thereat on blade-like protrusions 15 again in a known manner so as to prevent downward movement of the front cover 11 relative to the backing plate 12. The security screw threads through the collar 14 in the front housing 11 also threads under a tongue-like projection or tab 16 punched out of the backing plate 12 so that the front cover 11 cannot, in theory, be lifted up past the projection or tab 16 and off the backing plate 12. Practically speaking, however, we have found that it is possible to bend the projection or tab 16 if sufficient force is applied to the bottom of the front cover 11.

We have overcome the problem by providing a separate plate 17 which is attached to the backing plate 12 with the standard mounting screws or bolts 18, 19. The plate 17 has an upstanding portion 20 which contains a punched-out tongue-like projection or tab 21 which is complementary in size and shape to the projection 16. To provide additional strength and reinforcement, a bar 22 can be welded above the projection 21, although in practice this bar 22 is not strictly necessary.

To install the plate 17, the front cover 11 is removed from the backing plate 12. The standard mounting holes for the backing plate 12 are utilized to secure the plate 17 with the existing mounting screws/bolts 18, 19. The plate 17 is slid down so that the projection 16 mates with and supports the projection 21 on the plate 17. Then, the screws 18, 19 are passed through the backing plate 12, the support plate 17, or vice versa, to provide a secure arrangement. The front cover 11 is then put back on the backing plate 12, and the security screw 13 is threaded through the collar 14 in the front cover 11 until the free end of the screw 13 engages under the projection 16 to prevent upward movement of the front cover 11 relative to the backing plate 12 while the blade-like protrusions 15 prevent downward movement of the front cover 11 relative to the backing plate 12.

Although the invention has been described and illustrated in detail, it is to be clearly understood that the same is by way of illustration and example, and is not to be taken by way of limitation. For example, a high security lock can be used in place of the screw 13. The spirit and scope of the present invention are to be limited only by the terms of the appended claims.

What is claimed is:

1. In a telephone station having a front cover, a backing plate with a projection extending toward the front cover and a securing device abutting a first surface of the projection to prevent relative movement between the front cover and the backing plate, the improvement comprising a plate sized and configured to be secured to the backing plate without field modification and having means for complementing and thereby reinforcing the projection on the backing plate.

2. In a telephone station according to claim 1, wherein the reinforcing means comprises a projection sized and shaped to mate with a second surface of the projection on the backing plate opposite the front surface.

3. In a telephone station according to claim 2, wherein the reinforcing means further includes a rigid member fixed above the projection and opposite a surface of the projection mating with the second surface of the projection on the backing plate.

4. A method of reinforcing a backing plate projection on a backing plate and projecting toward a front cover in a telephone station without field modification of the station, comprising the steps of:

affixing an internal plate with a reinforcing projection complementary to the shape of the backing plate projection to the backing plate with standard backing plate mounting devices such that the internal plate reinforcing projection reinforces the backing plate projection;

affixing a front cover of the telephone station on the backing plate; and securing the front cover on the backing plate by interaction of the backing plate projection with a securing device threaded through the front cover.

* * * * *